No. 12,253. REISSUED AUG. 2, 1904.

O. H. MUNTZ.

HORSE BLANKET.

APPLICATION FILED MAR. 28, 1903.

Witnesses:

E. V. MacKenzie

Chas S. Lepley

Inventor:

Oliver H. Muntz by O. M. Clarke his Attorney.

No. 12,253. Reissued August 2, 1904.

UNITED STATES PATENT OFFICE.

OLIVER H. MUNTZ, OF GREENVILLE, PENNSYLVANIA, ASSIGNOR OF ONE-HALF TO JACOB H. MUNTZ, OF GREENVILLE, PENNSYLVANIA.

HORSE-BLANKET.

SPECIFICATION forming part of Reissued Letters Patent No. 12,253, dated August 2, 1904.

Original No. 664,967, dated January 1, 1901. Application for reissue filed March 28, 1903. Serial No. 150,070.

*To all whom it may concern:*

Be it known that I, OLIVER H. MUNTZ, a citizen of the United States, and a resident of Greenville, county of Mercer, formerly of Pittsburg, county of Allegheny, and State of Pennsylvania, have invented certain new and useful Improvements in Horse-Blankets, of which the following is a specification, reference being had to the accompanying drawings, forming part of this specification, in which—

Figure 1:
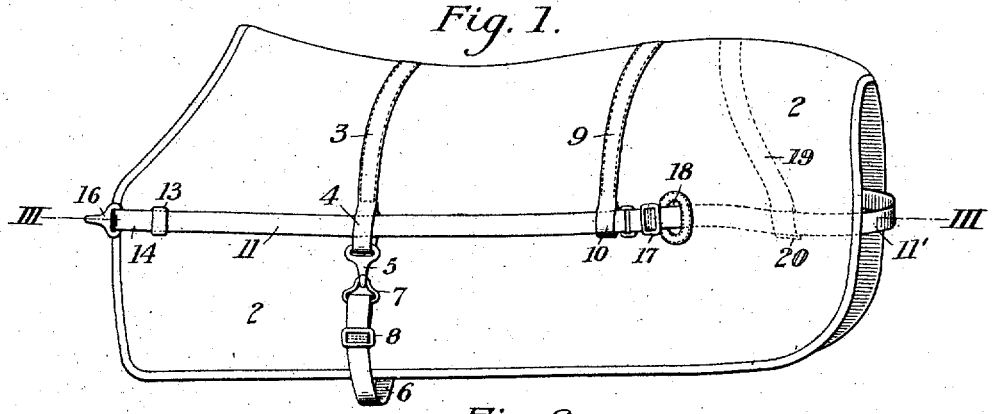
Figure 2:
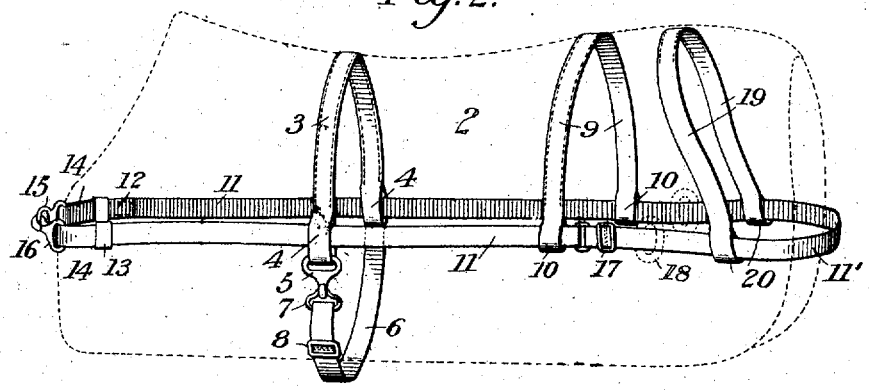
Figure 3:
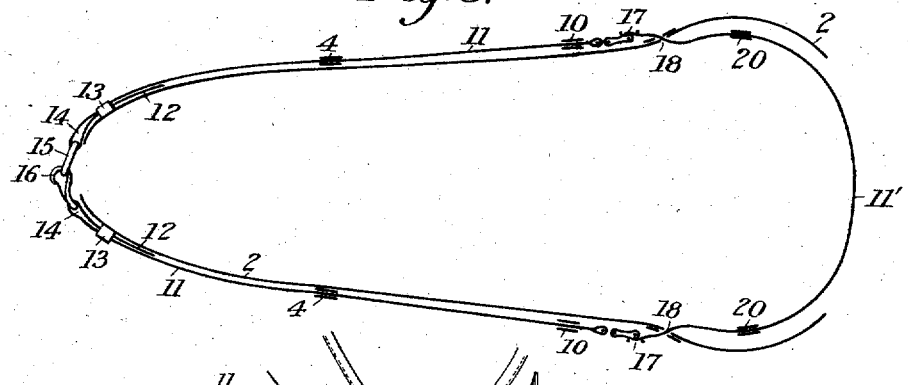
Figure 4:
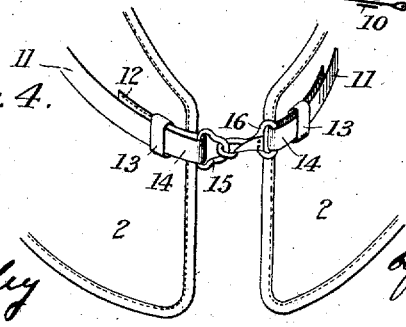

Figure 1 is a perspective view of my improved horse-blanket and attachments complete. Fig. 2 is a similar view illustrating the straps and attachments in relief, the blanket proper being indicated by dotted lines. Fig. 3 is a horizontal sectional view indicated by the line III III of Fig. 1. Fig. 4 is a perspective detail view of the construction and connections at the front end.

My invention relates to improvements in horse-blankets; and it consists of the means for securing and holding the blanket in position in such a manner as to provide for free motion of the horse without disarranging or dislodging the blanket.

Referring to the drawings, 2 represents the body portion of the blanket, of any suitable material and of a shape to conform to the body of the horse, as shown.

The girth-band consists of an upper portion 3, sewed or secured to the fabric of the blanket in any suitable manner and provided on each side with loops 4, which depend freely and unconnected from the blanket at positions about midway down from the central top. To the end of one of the girth-loops 4 is connected a metal snap 5, while the other girth-loop on the opposite side simply intervenes between the upper girth portion 3 and the lower extended portion 6, carried around under the horse and connected by a loop 7 at its extremity with the snap 5, its length being adjusted by a buckle 8. Back of the girth-band and attached to the blanket in a similar manner is a supporting-band 9, passing around over the top of the blanket and terminating in loops 10 at each side on substantially the same level as loops 4.

The longitudinal girth 11 extends along both sides and around the back, while its free ends are passed through keeper-straps 13, which are secured to the front portion of each side of the blanket. The said ends are then bent back, forming loops 14, and passed through the respective keeper-straps underneath between the longitudinal girth and the blanket and are secured to the latter, as shown at 12. The loop ends 14 are provided with an interacting loop and snap 15 16, by which the ends of the girth and the blanket are held together at front. It will be noted that with the exception of the connection at 12 the longitudinal girth is entirely free from positive attachment with the blanket, thus permitting movement of the animal without displacing the blanket, as the loops 14, by reason of the sliding action of the girth through the keepers 13 and their connections with the loop and snap 15 16, permit of lengthening or shortening of the projecting ends, so as to compensate for strain in either direction without imparting a corresponding strain on the blanket.

The longitudinal girth 11 is provided with a buckle 17 on one or both sides by which the girth may be lengthened or shortened. On each side openings 18 are provided in the blanket through which the longitudinal girth is passed, so that that portion of it, 11′, which comes in contact with and binds against the rump is underneath the blanket, allowing the blanket to depend freely over on the outside and away from frictional contact with the girth.

Supporting-straps 19, sewed or attached to the under side of the blanket, extend downwardly and are provided with terminal loops 20, through which the portion 11′ of the longitudinal girth is passed at each side, further supporting it at these points. By reason of the hips of the animal projecting out above this portion of the longitudinal girth there is no upward tendency of the girth portion 11′. In this manner the blanket is positively retained in position by reason of the girth 3 and front connections 14 15 16. The longitudinal girth, which is partly supported by the loops 4 and 10, while having good holding contact is still connected with the blanket in such a manner as to permit of free movement on account of the sliding connections, and the entire article is well adapted for quick adjustment and the usual objects in view and desirable in devices of this character.

The advantages of my invention will be appreciated by those accustomed to the use of this class of goods, and it will be found very desirable for the reasons noted.

What I claim is—

1. In a horse-blanket, the combination of a body-blanket portion, a surrounding girth attached thereto provided with sustaining-loops, supporting-bands on each side of the blanket provided with sustaining-loops, and a longitudinal girth secured to the front of the blanket at each side and provided with terminal connecting devices, said girth being passed backwardly through the sustaining-loops and through openings in the blanket at each side at the rear, substantially as set forth.

2. In a horse-blanket, the combination of a body-blanket portion, a surrounding transverse girth attached thereto, a longitudinal girth secured only to the front of the blanket at each side, and having loops formed at the front of each side of the blanket, the loops being provided with connecting devices, said longitudinal girth being passed backwardly through supporting-loops and through apertures in the blanket, substantially as set forth.

3. A horse-blanket provided with a longitudinal girth connected at the front to the blanket, said girth having loops formed at the front of each side of the blanket, the loops being provided with connecting devices, the girth being passed backwardly around the blanket on each side and through openings in the blanket, and sustaining-loops, for the longitudinal girth, on each side of and secured to the blanket, substantially as set forth.

4. A horse-blanket provided with a longitudinal girth having terminals connected at the front to the blanket, said girth having loops formed at the front of each side of the blanket, the loops being provided with connecting devices, the girth being passed backwardly around the blanket on each side and through openings in the blanket, sustaining-loops for the longitudinal girth on each outer side, similar loops on each inner side of the blanket back of the opening, the sustaining-loops being attached to the blanket, substantially as set forth.

5. In a horse-blanket, a longitudinal girth surrounding the forward sides of and passed underneath the blanket through openings therein at the rear, forming a continuous rear strap, said girth being looped forwardly at the front and provided with connecting devices and passed through keeper-straps attached to the blanket, the ends of the longitudinal girth being attached to the blanket on each forward side back of such keeper-straps, substantially as set forth.

6. A horse-blanket provided with girth-openings on each side, supporting-loops for the girth attached to the blanket, and a longitudinal girth surrounding the blanket, passed through the openings and loops and provided with connecting devices at the front, substantially as set forth.

7. In a horse-blanket provided with girth-openings, a longitudinal girth fastened to the blanket at the forward end thereof but free to move relatively to the blanket at the rearward end thereof and passing around the rear of the horse and means for lengthening and shortening said girth.

8. In a horse-blanket provided with girth-openings, a longitudinal girth fastened to the blanket near the front thereof, passing around the rear of the horse but unattached to the blanket at the rear portion thereof, and means for varying the length of the girth.

9. In a horse-blanket, a longitudinal girth passing through the blanket at each side and around the horse at the rear but unattached to the rearward portion of the blanket and a support for said longitudinal girth.

10. A horse-blanket having a longitudinal girth extending in proximity to its rear portion, means for sustaining said girth in loose contact with the blanket, and means for lengthening and shortening said girth.

11. A horse-blanket having a longitudinal girth extending rearwardly of said blanket, the rear portion of said girth being located within said blanket, means for sustaining said girth in loose contact with said blanket, and means for lengthening and shortening said girth.

12. A horse-blanket having a longitudinally-extending girth extending rearwardly of the blanket, means for sustaining said girth in loose contact with said blanket, means for lengthening and shortening said girth, and means located inside of said blanket for sustaining said girth.

13. A horse-blanket having a longitudinally-extending girth, openings in the rear portion of said blanket, the rear portion of said girth passing through said openings and located inside of said blanket, means located exteriorly of the blanket for sustaining said girth, and means located interiorly of said blanket for sustaining the rear portion of said girth.

14. A horse-blanket having a longitudinally extending girth, openings in the rear portion of said blanket, the rear portion of said girth passing through said openings and located inside of said blanket, means located exteriorly of the blanket for sustaining said girth, and means located interiorly of said blanket for sustaining the rear portion of said girth, in combination with means for lengthening and shortening said longitudinal girth.

In testimony whereof I affix my signature in presence of two witnesses.

OLIVER H. MUNTZ.

Witnesses:

GEORGE TABLER,

C. A. MUNTZ.